United States Patent
Sakai (10) Patent No.: US 12,043,730 B2
(45) Date of Patent: Jul. 23, 2024

(54) FUSED DEPOSITION MODELING TYPE ADDITIVE MANUFACTURING MATERIAL

(71) Applicant: Mitsubishi Chemical Corporation, Tokyo (JP)

(72) Inventor: Norihito Sakai, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 779 days.

(21) Appl. No.: 17/154,547

(22) Filed: Jan. 21, 2021

(65) Prior Publication Data

US 2021/0139688 A1 May 13, 2021

Related U.S. Application Data

(63) Continuation of application No. PCT/JP2019/029618, filed on Jul. 29, 2019.

(30) Foreign Application Priority Data

Jul. 30, 2018 (JP) .................................. 2018-142344

(51) Int. Cl.
 *B33Y 70/00* (2020.01)
 *B29C 64/314* (2017.01)
 (Continued)

(52) U.S. Cl.
 CPC ............ *C08L 29/04* (2013.01); *B29C 64/314* (2017.08); *B33Y 40/10* (2020.01); *B33Y 70/00* (2014.12); *B29K 2029/04* (2013.01)

(58) Field of Classification Search
 CPC .................... C08L 29/04; B33Y 70/00
 See application file for complete search history.

(56) References Cited

U.S. PATENT DOCUMENTS

| 3,607,812 A | 9/1971 | Takigawa et al. |
| 2007/0232753 A1 | 10/2007 | Monsheimer et al. |

(Continued)

FOREIGN PATENT DOCUMENTS

| EP | 3 238 711 | 11/2017 |
| JP | 2007-277546 | 10/2007 |

(Continued)

OTHER PUBLICATIONS

EESR issued in EP Patent Application No. 19844979.5, May 17, 2021.

(Continued)

*Primary Examiner* — Catherine S Branch
*Assistant Examiner* — Huihong Qiao
(74) *Attorney, Agent, or Firm* — GREENBLUM & BERNSTEIN, P.L.C.

(57) ABSTRACT

The present invention aims to provide a fused deposition modeling type additive manufacturing material which has flexibility when molded into a filamentous material such as a filament, and can exhibit an excellent manufacturing property when additive manufacturing is performed using a molded product thereof, and the fused deposition modeling type additive manufacturing material according to the present invention contains: a polyvinyl alcohol-based resin; a polyethylene glycol having a weight average molecular weight of 200 to 1,000; and a carboxylic acid metal salt in an amount of 0.8 mass % or less with respect to the polyvinyl alcohol-based resin.

6 Claims, 1 Drawing Sheet

(51) Int. Cl.
    *B33Y 40/10*           (2020.01)
    *C08L 29/04*           (2006.01)
    *B29K 29/00*           (2006.01)

(56) References Cited

U.S. PATENT DOCUMENTS

| | | |
|---|---|---|
| 2010/0120924 A1 | 5/2010 | Uramatsu et al. |
| 2015/0165020 A1 | 6/2015 | Jaklenec et al. |
| 2017/0087775 A1 | 3/2017 | Sakai et al. |
| 2017/0217531 A1 | 8/2017 | Kettler et al. |
| 2019/0193387 A1 | 6/2019 | Sakai et al. |
| 2019/0217531 A1 | 7/2019 | Ikeda et al. |
| 2019/0328871 A1 | 10/2019 | Jaklenec et al. |
| 2019/0344553 A1 | 11/2019 | Sakai et al. |

FOREIGN PATENT DOCUMENTS

| | | | |
|---|---|---|---|
| JP | 2017-507165 | 3/2017 | |
| JP | 2017-197723 | 11/2017 | |
| WO | 2008/133102 | 11/2008 | |
| WO | WO2009043588 A2 * | 4/2009 | ............ A61Q 17/00 |
| WO | 2015/182681 | 12/2015 | |
| WO | 2017/175792 | 10/2017 | |

OTHER PUBLICATIONS

ISR issued in WIPO Patent Application No. PCT/JP2019/029618, Oct. 29, 2019, English translation.
Written Opinion issued in WIPO Patent Application No. PCT/JP2019/029618, Oct. 29, 2019, English translation.
IPRP issued in WIPO Patent Application No. PCT/JP2019/029618, Feb. 2, 2021, English translation.

* cited by examiner

FUSED DEPOSITION MODELING TYPE ADDITIVE MANUFACTURING MATERIAL

CLAIM FOR PRIORITY

This application is a Continuation of PCT/JP2019/029618 filed Jul. 29, 2019, and claims the priority benefit of Japanese application 2018-142344 filed Jul. 30, 2018, the contents of which are expressly incorporated by reference herein in their entireties.

TECHNICAL FIELD

The present invention relates to a fused deposition modeling type additive manufacturing material, and more particularly to a fused deposition modeling type additive manufacturing material suitable as a base material for solid-dispersing of a drug.

BACKGROUND ART

In designing a preparation for oral administration, it is important to design bioavailability sufficiently high in terms of efficacy and safety.

One of important factors that influence the bioavailability of a pharmaceutical product is the solubility of a drug, and many studies on the relationship between the solubility and the absorption have been conducted so far. Particularly for the poorly soluble drug, it is known that the dissolution rate of a poorly soluble drug is a rate-determining stage of absorption. Various methods for improving the solubility of the poorly soluble drug are known, and a method for preparing a solid dispersion in a pharmaceutical form is particularly drawing attention.

The solid dispersion is one in which a drug (mainly a poorly soluble drug) is dispersed in a solid state on a solid dispersion base material (that is, an inert carrier). Examples of a production method thereof include a solvent method, a melting method, and a mixing and pulverization method (mechanochemical method).

The solvent method is a method for producing a solid dispersion by dissolving both a drug and a solid dispersion base material in an organic solvent and then removing the solvent, or dissolving a drug in an organic solvent, dispersing the obtained mixture in a solid dispersion base material and then removing the solvent.

The melting method uses lowering in melting points of a drug and a solid dispersion base material, and is a method of obtaining a solid dispersion by heating and melting the drug and the solid dispersion base material and then cooling, curing and pulverizing the molten mixture, or a method of obtaining a solid dispersion by heating and dissolving a drug in a water-soluble polymer having a relatively low melting point and cooling, curing and pulverizing the obtained mixture.

The mixing and pulverization method is a method for producing a solid dispersion by mixing and pulverizing a drug and a solid dispersion base material with a ball mill without heating, or mixing and pulverizing a drug and a solid dispersion base material by roll mixing, and making the poorly soluble drug to be amorphous. Mechanochemical is a phenomenon that mechanical energy (compression, shear, friction) causes a change in physicochemical properties of a substance. In this method, it is considered that various factors, such as lattice defects, lattice irregularities, and an increase in specific surface area and surface energy due to mechanical operation, improve the activity of the solid, and promote the amorphization of the drug and the dispersion of the amorphous drug in the carrier.

In the related art, a polyvinyl alcohol (PVA)-based resin is proposed to be used as one of solid dispersion base materials. For example, Patent Literature 1 proposes a solid dispersion base material containing a polyvinyl alcohol-based copolymer, and Patent Literature 2 discloses that a solid dispersion excellent in drug dissolution rate is obtained by using, as a solid dispersion base material, a polyvinyl alcohol-based resin having a carboxylic acid metal salt in a content of 0.8 wt % or less.

On the other hand, it is considered that a PVA-based resin has been widely studied as a support-forming material (support material) that is finally removed by water in a fused deposition modeling type additive manufacturing method (see, for example, Patent Literature 3), and a drug-containing fused deposition modeling type additive manufacturing material is used in production of a tablet-like solid dispersion in which a drug is dispersed in a PVA-based resin base material.

The solid dispersion base material in such an application needs to be a material that can be administrated orally. Even in the case of producing the solid dispersion (drug-containing fused deposition modeling type additive manufacturing material) by the fused deposition modeling type additive manufacturing, the material used therein is not only needs to be water-soluble, but also needs to be excellent in safety.

CITATION LIST

Patent Literature

Patent Literature 1: WO 2008/133102
Patent Literature 2: JP-A-2017-197723
Patent Literature 3: WO 2015/182681

SUMMARY OF INVENTION

Technical Problem

However, when the PVA-based resin used as the solid dispersant base material is used as the additive manufacturing material, the molding stability and the flexibility are not satisfactory. For example, the additive manufacturing material may be molded into a filament form as a precursor before molding, and since the filament is to be wound on a reel, the flexibility is required. In addition, when additive manufacturing is performed using such a filament, there is a demand for the manufacturing property that can stably supply the filament to a printer nozzle and that can accurately manufacture a product.

Therefore, the present invention has been made in view of such circumstances, and an object thereof is to provide a fused deposition modeling type additive manufacturing material which has flexibility when molded into a filamentous or string material such as a filament, can exhibit an excellent manufacturing property when additive manufacturing is performed using a molded product thereof, and which contains a water-soluble and highly safe material that can be administrated orally.

Solution to Problem

As a result of intensive studies, the present inventor found that the above problems can be solved by a fused deposition modeling type additive manufacturing material containing a polyvinyl alcohol (PVA)-based resin, a polyethylene glycol having a weight average molecular weight in a specific range, and a carboxylic acid metal salt in a specific small amount. Thus, the present invention has been completed.

That is, the present invention is characterized in the following (1) to (6).

(1) A fused deposition modeling type additive manufacturing material comprising: a polyvinyl alcohol-based resin; a polyethylene glycol having a weight average molecular weight of 200 to 1,000; and a carboxylic acid metal salt in an amount of 0.8 mass % or less with respect to the polyvinyl alcohol-based resin.

(2) The fused deposition modeling type additive manufacturing material according to the item (1), wherein a degree of saponification of the polyvinyl alcohol-based resin is 70 mol % to 100 mol %.

(3) The fused deposition modeling type additive manufacturing material according to the item (1) or (2), wherein an average degree of polymerization of the polyvinyl alcohol-based resin is 200 to 1,500.

(4) The fused deposition modeling type additive manufacturing material according to any one of items (1) to (3), a content of the polyethylene glycol is 1 to 50 parts by mass with respect to 100 parts by mass of the polyvinyl alcohol-based resin.

(5) The fused deposition modeling type additive manufacturing material according to any one of items (1) to (4), further comprising: a drug.

(6) The fused deposition modeling type additive manufacturing material according to any one of items (1) to (5), which is in a filament form.

Advantageous Effects of Invention

Since the fused deposition modeling type additive manufacturing material according to the present invention is less likely to undergo thermal decomposition during melt molding and is thus excellent in moldability and flexibility, the fused deposition modeling type additive manufacturing material can be wound on a reel without breaking or cracking, and can be stably supplied to the printer nozzle during additive manufacturing. Therefore, it is possible to manufacture a product having a small deviation from a target shape and size.

Therefore, the fused deposition modeling type additive manufacturing material according to the present invention can be suitably used as a base material for dispersing a drug in a solid state, and has a good manufacturing property of a three-dimensional object.

It is presumed that, in the present invention, molecules of polyethylene glycol intervene in gaps of the PVA-based resin and reduce the cohesive force between molecules of the PVA-based resin, thereby reducing the crystallinity of the PVA-based resin, and as a result, the melt viscosity is lowered, the flowability of the resin composition during melting is increased, and the flexibility is improved. It is also presumed that the crystallinity of the PVA-based resin is lowered to lower the melting point thereof and expand the melt moldable temperature range thereof, so that melt molding stability is obtained and an accurate manufactured product is obtained.

DESCRIPTION OF EMBODIMENTS

Hereinafter, a fused deposition modeling type additive manufacturing material according to the present invention will be described in more detail.

In the present description, "mass" has the same meaning as "weight".

The fused deposition modeling type additive manufacturing material according to the present invention contains: a polyvinyl alcohol (PVA)-based resin; a polyethylene glycol having a weight average molecular weight of 200 to 1,000; and a carboxylic acid metal salt in an amount of 0.8 mass % or less with respect to the PVA-based resin.

Hereinafter, each component will be described.
(PVA-Based Resin)

The PVA-based resin is a resin containing, as a main structural unit, a vinyl alcohol structural unit, and obtained by saponification of a vinyl ester-based resin obtained by polymerization of a vinyl ester-based monomer, and is composed of a vinyl alcohol structural unit in an amount equivalent to the degree of saponification and a vinyl ester structural unit remaining without being saponified.

The average degree of polymerization of the PVA-based resin for use in the present embodiment is preferably 200 to 1,500, more preferably 250 to 1,000, still more preferably 300 to 800, and particularly preferably 300 to 600.

When the average degree of polymerization of the PVA-based resin is too low, the molded product tends to have low strength and tends to be brittle, and when the average degree of polymerization is too high, shear heat tends to be generated during melt molding, and the PVA-based resin tends to be decomposed, making it difficult to produce a solid dispersion by using a melting method. In either case, it tends to be difficult to prepare a stable filament.

In the present embodiment, as the average degree of polymerization of polyvinyl alcohol, the average degree of polymerization determined by using the method according to JIS K 6726 is used.

The degree of saponification of the PVA-based resin is preferably 70 mol % to 100 mol %, more preferably 70 mol % to 95 mol %, still more preferably 70 mol % to 92 mol %, and particularly preferably 70 mol % to 90 mol %.

When the degree of saponification of the PVA-based resin is too low, the flexibility and the tackiness increase, making it difficult to use the molded product. Thus, the degree of saponification is preferably 70 mol % or more. The PVA-based resin may be a completely saponified product (that is, having a degree of saponification of 100 mol %). However, since the melting point is increased when the degree of saponification is too high, the difference between the melting point and the decomposition temperature is narrowed, and the melt moldable temperature range is narrowed. As a result, the melt molding may be difficult, and the flexibility tends to be poor.

In the present embodiment, the degree of saponification of the PVA-based resin is a value determined by the method according to JIS K6726.

The viscosity of an aqueous solution of the PVA-based resin may be used as an index of the degree of polymerization of the PVA-based resin. The viscosity of the aqueous solution of the PVA-based resin for use in the present embodiment is preferably 1.5 mPa·s to 20 mPa·s, more preferably 2 mPa·s to 12 mPa·s, and still more preferably 2.5 mPa·s to 8 mPa·s, as the viscosity of the 4 mass % aqueous solution of the PVA-based resin at 20° C. The problems when the viscosity is too low and when the viscosity is too high are the same as in the case of the average degree of polymerization.

In the present embodiment, the viscosity of the aqueous solution of the PVA-based resin is the viscosity of the 4 wt % aqueous solution of the PVA-based resin at 20° C. measured according to JIS K6726.

Hereinafter, the method for producing the PVA-based resin for use in the present embodiment will be described in more detail.

The PVA-based resin is obtained, for example, by saponification of a polyvinyl ester-based polymer obtained by polymerization of a vinyl ester-based monomer.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, and from the viewpoint of profitability, vinyl acetate is preferred.

In addition, the vinyl ester-based monomer can be copolymerized with a copolymerizable monomer to such an extent that the effects of the present invention are not impaired. Examples of the copolymerizable monomer include: olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives such as an acylated product thereof; unsaturated acids such as an acrylic acid, a methacrylic acid, a crotonic acid, a maleic acid, a maleic anhydride, an itaconic acid, an undecylenic acid, and a salt and an ester thereof, such as a monoester or a dialkyl ester; nitriles such as acrylonitrile and methacrylonitrile; amides such as diacetone acrylamide, acrylamide and methacrylamide; olefin sulfonic acids such as an ethylene sulfonic acid, an allyl sulfonic acid, a methallyl sulfonic acid and a salt thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolan, and glycerin monoallyl ether; substituted vinyl acetates such as isopropenyl acetate and 1-methoxyvinyl acetate; vinylidene chloride; 1,4-diacetoxy-2-butene; 1,4-dihydroxy-2-butene; vinylene carbonate; and hydroxymethyl vinylidene diacetate such as 1,3-diacetoxy-2-methylenepropane, 1,3-dipropionyloxy-2-methylenepropane, and 1,3-dibutyronyloxy-2-methylenepropane. The content of the copolymerizable monomer is generally 10 mol % or less, preferably 5 mol % or less, and particularly preferably 1 mol % or less, based on the total amount of the polymers. In the present invention, from the viewpoint of safety, an unmodified PVA consisting only of a vinyl alcohol structural unit and a vinyl ester structural unit having an unsaponified moiety is preferred.

There is no particular limitation in polymerizing the vinyl ester-based monomer and the copolymerizable monomer. Known methods such as bulk polymerization, solution polymerization, suspension polymerization, dispersion polymerization, or emulsion polymerization can be adopted, and solution polymerization is generally performed.

Examples of a solvent for use in the polymerization include generally aliphatic alcohols having 1 to 4 carbon atoms such as methanol, ethanol, isopropyl alcohol, n-propanol, and butanol, or ketones such as acetone and methyl ethyl ketone. Industrially, methanol is preferably used.

The polymerization reaction is carried out, for example, using a known radical polymerization catalyst such as azobisisobutyronitrile, acetyl peroxide, benzoyl peroxide, and lauroyl peroxide, or various known low temperature active catalysts. The reaction temperature is selected from the range of 35° C. or higher and equal to lower than the boiling point of the known radical polymerization catalyst or various known low temperature active catalysts.

The obtained vinyl ester-based polymer is then saponified in a continuous manner or a batch manner. In this saponification, either alkali saponification or acid saponification can be adopted, but industrially, alkali saponification performed by dissolving the polymer in an alcohol in the presence of an alkali catalyst is preferred.

The alcohol is preferably an aliphatic alcohol having 1 to 4 carbon atoms such as methanol, ethanol, isopropyl alcohol, n-propanol, and butanol. Among these, methanol or ethanol is more preferred. The concentration of the polymer in the alcohol is selected from the range of 20 mass % to 60 mass %. If necessary, about 0.3 mass % to 10 mass % of water may be added, and further various esters such as methyl acetate and various solvents such as benzene, hexane and DMSO (dimethyl sulfoxide) are added.

Specific examples of the above alkali catalyst include alkali metal hydroxides such as sodium hydroxide, potassium hydroxide, sodium methylate, sodium ethylate, and potassium methylate, or alcoholates. The amount of such a catalyst used is preferably 1 to 100 millimolar equivalents with respect to the monomer.

When the alkali catalyst is used as the saponification catalyst, an alkali metal in the catalyst is present as a carboxylic acid metal salt in the PVA-based resin, and is brought into the fused deposition modeling type additive manufacturing material according to the present application. When a large amount of such a carboxylic acid metal salt remains, it should be removed by washing or the like until the content thereof is an appropriate amount.

Examples of the washing method include a batch washing method and a continuous washing method, and a batch washing method is generally adopted. Examples of the stirring system (device) during the washing include a screw blade, a ribbon blender, and a kneader.

Examples of the washing device include a cylindrical washing device, a countercurrent contact washing device, and a centrifugal washing device.

Examples of the washing liquid include alcohols such as methanol, ethanol, isopropyl alcohol, and butanol. Preferred for washing efficiency and drying efficiency is methanol. The bath ratio (mass of washing liquid to mass of PVA-based resin) is generally 1 to 30, and particularly preferably 2 to 20. When the bath ratio is too large, a large washing device is required and the cost tends to increases, and when the bath ratio is too small, washing performance tends to be poor and the washing tends to be performed frequently.

The washing temperature is generally 10° C. to 80° C., and particularly preferably 20° C. to 70° C. When the washing temperature is too high, the vaporization amount of the washing liquid increases, and reflux equipment tends to be necessary. When the washing temperature is too low, the washing efficiency tends to decrease. The washing time is generally 5 minutes to 12 hours, and particularly preferably 30 minutes to 4 hours. When the washing time is too long, the production efficiency tends to decrease, and when the washing time is too short, the washing may be insufficient, the carboxylic acid metal salt cannot be removed, and more than 0.8 mass % of the carboxylic acid metal salt may remain. The washing is performed generally 1 to 10 times, and particularly preferably 1 to 5 times. When washing is performed too frequently, the productivity becomes poor and the cost tends to increase.

The washed PVA-based resin is generally in the form of powders, and the PVA-based resin for use in the present embodiment is obtained by drying this PVA-based resin with hot air or the like in a continuous manner or a batch manner. The drying temperature is generally 50° C. to 150° C., preferably 60° C. to 130° C., and particularly preferably 70° C. to 110° C. When the drying temperature is too high, the PVA-based resin tends to be thermally deteriorated, and when the drying temperature is too low, it tends to take a long time for drying. The drying time is generally 1 to 48 hours, and particularly preferably 2 to 36 hours. When the drying time is too long, the PVA-based resin tends to be thermally deteriorated, and when the drying time is too short, the drying tends to be insufficient or high temperature drying tends to be required.

The content of the solvent contained in the PVA-based resin after the drying is generally 0 mass % to 10 mass %, particularly preferably 0.01 mass % to 5 mass %, and particularly preferably 0.1 mass % to 1 mass %.

Thus, the PVA-based resin for use in the present embodiment is obtained.

In the fused deposition modeling type additive manufacturing material according to the present invention, the content of the PVA-based resin is preferably 20 mass % or more, more preferably 30 mass % to 95 mass %, and still more preferably 40 mass % to 90 mass %. When the content is too small, in blending the drug with the fused deposition modeling type additive manufacturing material, the amorphous state of the drug cannot be maintained, so that the solubility of the drug is limited, and it may be difficult to exhibit the desired effect of the drug. When the content of the PVA-based resin is too large, the effect of the drug tends to be poor.

(Polyethylene Glycol)

The fused deposition modeling type additive manufacturing material according to the present embodiment contains a polyethylene glycol having a weight average molecular weight of 200 to 1,000. When the weight average molecular weight of the polyethylene glycol is too small, in melt-kneading the fused deposition modeling type additive manufacturing material, the polyethylene glycol tends to be rejected from the PVA-based resin, and the flexibility of the fused deposition modeling type additive manufacturing material tends to be impaired. When the weight average molecular weight is too large, the polyethylene glycol cannot be melt-blended with the PVA-based resin, so that the flexibility of the fused deposition modeling type additive manufacturing material is lowered, and the melting point lowering effect tends to be hindered or the flowability tends to be inhibited.

The weight average molecular weight of the polyethylene glycol is preferably 200 to 800, and more preferably 300 to 500.

The weight average molecular weight of the polyethylene glycol is measured by a method according to FDA 21CFR § 172.820.

The content of the polyethylene glycol in the fused deposition modeling type additive manufacturing material is preferably 1 mass % to 25 mass %, more preferably 1 mass % to 20 mass %, still more preferably 3 mass % to 15 mass %, and particularly preferably 5 mass % to 10 mass %. When the content of the polyethylene glycol in the fused deposition modeling type additive manufacturing material is too small, the plasticizing effect is insufficient, making the melting point of the fused deposition modeling type additive manufacturing material high and the difference between the melting point and the decomposition temperature small; so that the melt moldable temperature range tends to be narrowed and the flowability of the fused deposition modeling type additive manufacturing material tends to be lowered. When the content of the polyethylene glycol in the fused deposition modeling type additive manufacturing material is too large, in the melt molding, the fused deposition modeling type additive manufacturing material may be too soft and cannot be molded. In any case, stable production tends to be impossible.

The polyethylene glycol is preferably contained in the range of 1 to 50 parts by mass, more preferably 1 to 40 parts by mass, still more preferably 5 to 30 parts by mass, and particularly preferably 8 to 20 parts by mass with respect to 100 parts by mass of the PVA-based resin. When the content of the polyethylene glycol with respect to the PVA-based resin is too small, the cohesive force between the PVA-based resins may be increased, the melting point may be increased, the moldability may be lowered, and stable filament preparation may be difficult. When the content of the polyethylene glycol with respect to the PVA-based resin is too large, the flexibility may be too high, and the flowability of the resin composition may be too high, which may also impair the stable filament preparation.

(Carboxylic Acid Metal Salt)

The fused deposition modeling type additive manufacturing material according to the present embodiment contains a carboxylic acid metal salt in an amount of 0.8 mass % or less with respect to the PVA-based resin.

When the content of the carboxylic acid metal salt is more than 0.8 mass %, stability during the melt molding tends to be lowered, and stable filament preparation is difficult. The content of the carboxylic acid metal salt is more preferably 0.5 mass % or less, and more preferably 0.1 mass % or less. The lower limit thereof is not particularly limited, and almost no carboxylic acid metal salt may be contained, that is, 0.05 mass %, and preferably 0.0001 mass %.

It is presumed that since the carboxylic acid metal salt has a catalytic action on the hydrolysis of the PVA-based resin, when the content thereof is large, the molecular weight is lowered due to the hydrolysis of the PVA-based resin during heat melting, resulting in a lowered melt moldability and lowered physical properties of the obtain molded product.

The content of the carboxylic acid metal salt in the present embodiment is obtained by dissolving the fused deposition modeling type additive manufacturing material in water, using methyl orange as an indicator, and performing neutralization titration with hydrochloric acid.

Examples of the carboxylic acid in the carboxylic acid metal salt in the present invention include formic acid, acetic acid, propionic acid, butyric acid, valeric acid, caproic acid, enanthic acid, caprylic acid, pelargonic acid, capric acid, lauric acid, mistyric acid, palmitic acid, margaric acid, stearic acid, oleic acid, sorbic acid, oxalic acid, malonic acid, succinic acid, glutaric acid, adipic acid, fumaric acid, and maleic acid. Among these, from the viewpoint of solubility in water, formic acid, acetic acid, propionic acid, and caprylic acid are preferred, and acetic acid is particularly preferred.

In addition, examples of the metal salt include salts of alkali metals such as sodium and potassium, and salts of divalent metals such as magnesium and calcium. Among these, from the viewpoint of a great effect on the amount used, salts of alkali metals are preferred, and sodium salts are particularly preferred.

Specifically, sodium acetate is most preferred.

Examples of a method for containing a predetermined amount of the carboxylic acid metal salt in the fused deposition modeling type additive manufacturing material according to the present invention include (i) a method of containing the carboxylic acid metal salt as a saponification catalyst and (ii) a method of adding the carboxylic acid metal salt after the production of the PVA-based resin. As described above, when a hydroxide of an alkali metal is used as a saponification catalyst in the production of the PVA-based resin, the alkali metal in this catalyst is by-produced as a carboxylic acid metal salt during saponification and remains in the PVA-based resin. Therefore, it is preferable to use a hydroxide of an alkali metal.

In this way, when a carboxylic acid alkali metal salt derived from a hydroxide of an alkali metal used as a catalyst in the production of the PVA-based resin is applied to the carboxylic acid metal salt in the present invention, in order to keep the content thereof in the fused deposition modeling type additive manufacturing material at 0.8 mass % or less, (i) a method of washing with a solvent such as an alcohol after the production of the PVA-based resin and (ii) a method of reducing the amount of the catalyst during the saponification are used. The method (i) is preferred because the steps are simple.

(Other Plasticizers)

The fused deposition modeling type additive manufacturing material according to the present embodiment may optionally contain a plasticizer other than polyethylene glycol.

Examples of the plasticizer include ethylene glycol, diethylene glycol, triethylene glycol, tetramethylene glycol, polyethylene glycol having a weight average molecular weight of more than 1,000, glycols such as trimethylene glycol, tetramethylene glycol, pentamethylene glycol, hexamethylene glycol, propylene glycol, dipropylene glycol, tripropylene glycol, and polypropylene glycol, diols such as 1,3-butanediol and 2,3-butanediol, trimethylolpropane, diglycerin, 3-methyl-1,3,5-pentanetriol, sorbitol, and mannitol.

In addition, the fused deposition modeling type additive manufacturing material according to the present embodiment may contain other additives in a range where the effects of the present invention are not impaired. Examples of the additive include an antioxidant, an ultraviolet absorber, a colorant, an anti-sticking agent, and a lubricant.

(Method for Preparing Fused Deposition Modeling Type Additive Manufacturing Material)

For the fused deposition modeling type additive manufacturing material according to the present embodiment, for example, a solid dispersion containing respective components is obtained and this solid dispersion is formed into a fused deposition modeling type additive manufacturing material. Examples of the method for producing the fused deposition modeling type additive manufacturing material include the following methods.

(i) Solvent method: a method of dissolving respective components in an organic solvent and then removing the solvent.

(ii) Melting method: a method of heating and melt-kneading respective components, and then cooling and curing the obtained mixture.

(iii) Mixing and pulverization method (mechanochemical method): a method of fining and uniformly dispersing respective components using mechanical energy such as compression, shear, and friction.

Among these, the melting method (ii) is preferred from the viewpoint of crystal control.

Hereinafter, the melting method will be described in detail.

The melting method is a method of obtaining a fused deposition modeling type additive manufacturing material by subjecting a mixture of respective components to a heat treatment and adjusting (pulverizing, powdering, or molding) the form of the heat-treated product, as necessary.

The heat treatment for the mixture of respective components may be a temperature at which the entire mixture is melted, or may be a temperature at which a part of the components is melted. The temperature condition under which some or all of the components become amorphous can be selected according to the characteristics even when the melting does not occur.

Even when the melting does not occur, a part or all of the components can be amorphized to obtain a fused deposition modeling type additive manufacturing material. In the present invention, this case is also included in the melting method.

The mixture of respective components includes a mixture obtained by a method of blending the remaining components with the molten component, or a mixture obtained by a method of dry-blending all components and then melt-kneading the blended components.

The heating means used for the heat treatment is not particularly limited, and it is possible to adopt appropriate heating means available to those skilled in the art. More specifically, heating by using a dryer, oil bath, or electric furnace, heating by using ultrasonic irradiation, heating by using biaxial kneading treatment, heating by using uniaxial and biaxial melt extrusion processing (extruder), heating by using microwave irradiation, or the like may be used.

The fused deposition modeling type additive manufacturing material obtained by heat treatment can be appropriately formed into a desired shape by any means available to those skilled in the art. Examples of the means include pulverization means and molding means. Examples of the molding means include extrusion molding (e.g., single-screw extrusion, twin-screw extrusion, multi-screw extrusion, and a hot melt calendering method), injection molding (e.g., twin-screw extruder), and compression molding (e.g., tableting and granulation).

The temperature in the heat treatment is not necessarily the temperature at which each component melts. The fused deposition modeling type additive manufacturing material can be produced at a heating temperature lower than the melting temperature. In the present invention, when producing the fused deposition modeling type additive manufacturing material at a temperature as low as possible, in the case of containing a drug that is decomposed or deteriorates at a high temperature, a drug-containing fused deposition modeling type additive manufacturing material can be obtained.

The temperature in the heat treatment is generally 80° C. to 220° C., preferably 120° C. to 200° C., and more preferably 150° C. to 200° C. Ultrasonic irradiation is to apply ultrasonic waves to a powder mixture. In the case of heating by using ultrasonic irradiation, the ultrasonic irradiation energy is generally 600 J to 2,000 J, preferably 700 J to 1,800 J, and more preferably 800 J to 1,300 J. As such a device, an ultrasonic molding machine USTM/L20 manufactured by Technea Engineering can be used. In such a device, a powder mixture of respective components is filled in a die provided in the device, and compression molding is performed while irradiating the mixture with ultrasonic waves.

In addition, heating means by using a twin-screw extruder or a twin-screw extruder is also included. In the present invention, the fused deposition modeling type additive manufacturing material is preferably produced by using, as the heat treatment, means combining compression molding and ultrasonic irradiation, a twin-screw extruder equipped with heating means, and a twin-screw extruder equipped with heating means.

Since the fused deposition modeling type additive manufacturing material according to the present embodiment is excellent in molding stability, a fused deposition modeling type additive manufacturing filament containing the fused deposition modeling type additive manufacturing material is unlikely to be cracked or broken (cracked) even when bent. Therefore, a roll can be formed by winding the fused deposition modeling type additive manufacturing filament, and the roll can be housed in a cartridge to form a fused deposition modeling type 3D printer mounting cartridge.

(Drug-Containing Fused Deposition Modeling Type Additive Manufacturing Material)

The fused deposition modeling type additive manufacturing material according to the present embodiment can contain a drug in a range where the effects of the present invention are not impaired. The drug is a component that exerts a medicinal effect when used as a pharmaceutical product.

Examples of the drug contained in the fused deposition modeling type additive manufacturing material include the following.

(1) Antipyretic/analgesic/antiinflammatory drugs
(2) Tranquilizers
(3) Antipsychotics
(4) Antibacterial drugs
(5) Antibiotics
(6) Antineoplastic drugs
(7) Antihyperlipidemic drugs
(8) Antitussive and expectorant drugs
(9) Muscle relaxants
(10) Antiepileptic drugs
(11) Anti-ulcerogenic drugs
(12) Antidepressants
(13) Anti-allergic drugs
(14) Cardiants
(15) Antiarrhythmic drugs
(16) Vasodilators
(17) Antihypertensive diuretics
(18) Antidiabetic drugs
(19) Anti-tuberculosis drugs
(20) Narcotic antagonists
(21) Hormonal drugs
(22) Bone/cartilage disease preventive and therapeutic agents
(23) Arthropathy therapeutic agents
(24) Pollakiuria treatment hydrochloric acid
(25) Antiandrogenic agents
(26) Fat-soluble vitamin drugs
(27) Vitamin derivatives In the present embodiment, from the viewpoint of improving the solubility of the drug in the body, it is preferable to use a poorly soluble drug as the drug. Examples of the poorly soluble drug suitably used in the present embodiment include carbamazepine, indomethacin, naproxen, ibuprofen, phenacetin, phenylbutazone, griseofulvin, azole-based compounds, phenytoin, isosorbite dinitrate, and nitrophenylpyridine-based compounds. The nitrophenylpyridine-based compound contains a poorly soluble compound having a nitrophenyl group and a pyridine ring structure. The nitrophenylpyridine-based compound is preferably a compound having a structure in which a nitrophenyl group is bonded to any of the 2nd to 4th positions of the pyridine ring. Specific compounds include nifedipine and nilvadipine.

The content of the drug in the fused deposition modeling type additive manufacturing material is appropriately adjusted according to the bioavailability. The drug may be diluted with a diluent or the like commonly used in the medical or food fields. In addition, the drug may be treated for the purpose of masking the bitter taste thereof.

The content of the drug in the fused deposition modeling type additive manufacturing material is preferably 0.001 mass % to 5 mass %, and more preferably 0.01 mass % to 3 mass %. When the content of the drug is too small, the medicinal effect thereof may not be sufficiently exerted, and when the content of the drug is too large, it may be harmful to the human body.

In addition, the drug-containing fused deposition modeling type additive manufacturing material can contain various additives in a range where the effects of the present invention are not impaired. Examples of the additive include an excipient, a disintegrant, a pH adjuster, a fluidizer, a surfactant, a colorant, a sweetener, and a coating agent.

EXAMPLES

Hereinafter, the present invention is demonstrated further more concretely by ways of Examples, but the present invention is not limited to following Examples, unless the gist of the present invention is exceeded.

In the examples, "part" and "%" are on a mass basis.

Example 1

[Preparation of PVA-Based Resin]

To a reactor vessel equipped with a reflux condenser, a dropping funnel, and a stirrer, 280 parts of vinyl acetate, 300 parts of methanol, and 0.01 mol % (with respect to the amount of the charged vinyl acetate) of azobisisobutyronitrile were charged. While stirring under a nitrogen stream, the temperature was raised until the reflux started, and 30 minutes after the reflux started, 720 parts of vinyl acetate was dropped at a constant rate for 9.5 hours, so as to carry out polymerization. When the degree of polymerization of vinyl acetate reached 92% after dropping, m-dinitrobenzene was added thereto to terminate the polymerization. Subsequently, by a method of blowing methanol vapor, the unreacted vinyl acetate monomer was removed from the system, whereby a methanol solution of a vinyl acetate polymer (resin content 53%) was obtained.

Subsequently, the above methanol solution was diluted with methanol to adjust the concentration to 50%, and the diluted methanol solution was charged into a kneader. The solution temperature was maintained at 35° C., and a methanol solution of 4% sodium hydroxide (in terms of sodium) was added in an amount of 6.0 mmol with respect to 1 mol of vinyl acetate structural units in the polymer, thereby carrying out saponification. As the saponification proceeded, a saponified product was deposited, and when the form of the deposited saponified product was turned into a particle, the saponified product was subjected to solid-liquid separation by filtration and then dried.

When the dried powder of the obtained PVA-based resin was analyzed based on an alkali consumption required for hydrolysis of remaining vinyl acetate, the degree of saponification was 88 mol %, the viscosity of the 4% aqueous solution thereof at 20° C. was 5.4 mPa·s, and the average degree of polymerization was 550.

The PVA-based resin obtained above was subjected to washing. First, the dried powder of the PVA-based resin was charged into methanol with a bath ratio of 10 times, stirred for 3 hours, and washed. Thereafter, solid-liquid separation was performed, and the obtained PVA-based resin powder was vacuum-dried at 90° C. until the volatile content was 1% or less to obtain a dried powder of the PVA-based resin (PVA-based resin A).

The content of sodium acetate was determined by dissolving the dried powder of the PVA-based resin in water, using methyl orange as an indicator, and performing neutralization titration with hydrochloric acid. The content of sodium acetate was 0.05%.

Hereinafter, the neutralization titration will be described in detail.

First, into an Erlenmeyer flask, 3.00 g of the dried powder of the PVA-based resin and 100 ml of water were charged, the Erlenmeyer flask together with the contents was placed in a heating stirring dissolver, and the contents were heated and stirred until the dried powder of the PVA-based resin was completely dissolved. Next, the air-cooled tube was taken out, and the solution was left for 30 minutes to remove the residual solvent in the dried powder of the PVA-based resin and was cooled to room temperature.

Three drops of methyl orange was dropped into 100 ml of the obtained PVA-based resin aqueous solution and 100 ml of pure water (blank test, standard color). 0.1N—HCl was added drop by drop to the PVA-based resin aqueous solution, titration was continued until the same color as pure water was obtained, and the amount of sodium acetate was calculated from the amount of 0.1N—HCl required for neutralization.

[Preparation of Filament]

100 parts of the PVA-based resin A (dried powder) obtained above and 11 parts of polyethylene glycol (weight average molecular weight: 400) were mixed and supplied to a twin-screw extruder. The mixture was melt-kneaded under the following conditions, extruded into a strand having a diameter of 1.75 mm, air-cooled on a belt, and wound on a reel to obtain a filament.

<Melt-Kneading Conditions>

Extruder: 15 mm in diameter, L/D=60, manufactured by Technovel Corporation

Extrusion temperature: C1/C2/C3/C4/C5/C6/C7/C8/D=90/150/180/190/200/200/200/200/200 (° C.)

Rotation speed: 200 rpm

Discharge rate: 1.5 kg/h

[Flexibility Evaluation]

The obtained filament was wound on a reel (diameter: 100 mm) and evaluated based on the following evaluation criteria. The results are shown in Table 1.

<Evaluation Criteria>

A (good): The filament can be wound without breaking.

F (poor): The filament breaks or cracks occur during winding.

[Manufacturing Property Evaluation]

Figure 1:
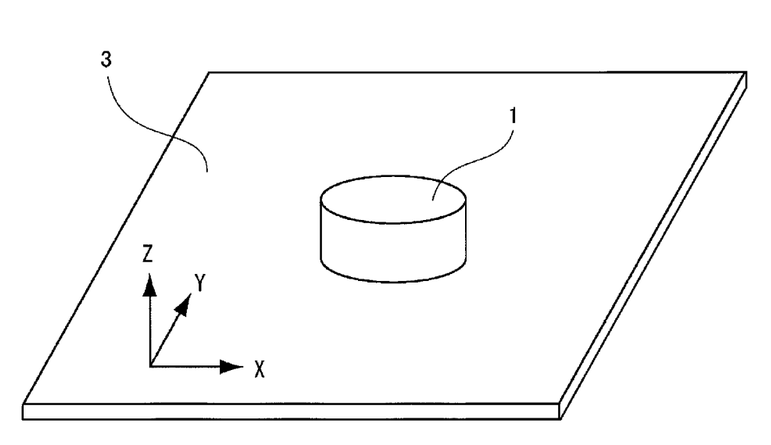
FIG. 1 is a diagram illustrating a method for manufacturing tablets prepared in Examples and Comparative Examples.

The filament (diameter: 1.75 mm) obtained above was set in a fused deposition modeling type 3D printer ("FDM-200HWX" (trade name) manufactured by Ninjabot), and as shown in FIG. 1, a tablet 1 (11 target diameters: 5 mm, 6 mm, 7 mm, 8 mm, 9 mm, 10 mm, 11 mm, 12 mm, 13 mm, 14 mm, 15 mm, height: 2 mm) was manufactured on an upper surface (XY plane) of a platform 3 with the Z-axis direction as the additive direction.

The diameter of the obtained tablet was measured, and the ratio to the target diameter (measured diameter/target diameter) was calculated. The results are shown in Table 1.

Example 2

[Preparation of PVA-Based Resin]

A PVA-based resin B was prepared in the same manner as in Example 1, except that the saponification time in Example 1 was adjusted to obtain a PVA-based resin having a degree of saponification of 72 mol %.

In the PVA-based resin B, the viscosity of the 4% aqueous solution thereof at 20° C. was 5.4 mPa·s, the average degree of polymerization was 550, and the content of sodium acetate was 0.05%.

[Preparation and Evaluation of Filament]

100 parts of the PVA-based resin B (dried powder) obtained above and 5.3 parts of polyethylene glycol (weight average molecular weight: 300) were mixed and supplied to a twin-screw extruder to obtain a filament in the same manner as in Example 1.

The obtained filament was evaluated for flexibility and manufacturing property in the same manner as in Example 1. The results are shown in Table 1.

Example 3

A filament was prepared in the same manner as in Example 2 except that polyethylene glycol having a weight average molecular weight of 400 was used as polyethylene glycol and the content thereof was changed to 33 parts. The obtained filament was evaluated for flexibility and manufacturing property in the same manner as in Example 1. The results are shown in Table 1.

Comparative Example 1

[Preparation of PVA-Based Resin]

A PVA-based resin C was prepared in the same manner as in Example 1 except that the washing of the PVA-based resin in Example 1 was not performed.

In the PVA-based resin C, the degree of saponification was 88 mol %, the viscosity of the 4% aqueous solution thereof at 20° C. was 5.4 mPa·s, the average degree of polymerization was 550, and the content of sodium acetate was 1.2%.

[Preparation and Evaluation of Filament]

100 parts of the PVA-based resin C (dried powder) obtained above and 11 parts of polyethylene glycol (weight average molecular weight: 400) were mixed and supplied to a twin-screw extruder to obtain a filament in the same manner as in Example 1. However, the PVA-based resin C was decomposed due to heat deterioration, and a filament could not be prepared.

In Comparative Example 1, since the filament could not be prepared due to the decomposition of the PVA-based resin C, the test for confirming the manufacturing property was not performed.

Comparative Example 2

A filament was prepared in the same manner as in Example 1 except that polyethylene glycol having a weight average molecular weight of 10,000 was used as polyethylene glycol. The obtained filament was evaluated for flexibility in the same manner as in Example 1. The results are shown in Table 1.

In Comparative Example 2, in the test for confirming the production stability of the filament, the filament could not be stably wound up, and thus the test for confirming the manufacturing property was not performed.

Comparative Example 3

[Preparation and Evaluation of Filament]

A filament was obtained in the same manner as in Example 1 except that polyethylene glycol in Example 1 was changed to 11 parts of glycerin.

The obtained filament was evaluated for flexibility and manufacturing property in the same manner as in Example 1. The results are shown in Table 1.

TABLE 1

| | PVA-based resin | | | | Polyethylene glycol | | |
|---|---|---|---|---|---|---|---|
| | Content (part by mass) | Average polymerization degree | Degree of saponification (mol %) | Residual sodium acetate (mass %) | Content (part by mass) | Average polymerization degree | Flexibility |
| Example 1 | 100 | 550 | 88 | 0.05 | 11 | 400 | A |
| Example 2 | 100 | 550 | 72 | 0.05 | 5.3 | 300 | A |
| Example 3 | 100 | 550 | 72 | 0.05 | 33 | 400 | A |
| Comparative Example 1 | 100 | 550 | 88 | 1.2 | 11 | 400 | Thermal decomposed |
| Comparative Example 2 | 100 | 550 | 88 | 0.05 | 11 | 10,000 | F |
| Comparative Example 3 | 100 | 550 | 88 | 0.05 | Glycerin 11 | — | A |

| | Target diameter (mm) | | | | | | | | | |
|---|---|---|---|---|---|---|---|---|---|---|
| | 5 | 6 | 7 | 8 | 9 | 10 | 11 | 12 | 13 | 14 | 15 |
| | Measured diameter (mm)/target diameter (mm) | | | | | | | | | |
| Example 1 | 104.8 | 102.2 | 98.7 | 102.4 | 101.8 | 101.5 | 102 | 101.4 | 100.7 | 100.4 | 100.9 |
| Example 2 | 104.7 | 103.3 | 100.7 | 100 | 102.3 | 102.3 | 100.7 | 99.3 | 99 | 98.7 | 100.7 |
| Example 3 | 106.2 | 105 | 102.3 | 102 | 102.1 | 101.2 | 101.6 | 101 | 100.3 | 101.1 | 100.7 |
| Comparative Example 1 | Since a stable filament cannot be prepared due to thermal decomposition, manufacturing with a 3D printer is not possible. | | | | | | | | | |
| Comparative Example 2 | The filament is too hard and is broken during manufacturing with a 3D printer, and continuous manufacturing is not possible. | | | | | | | | | |
| Comparative Example 3 | The flexibility is too high, and the filament cannot be sent out from the printer nozzle. | | | | | | | | | |

From the results in Table 1, it can be predicted that the fused deposition modeling type additive manufacturing material according to the present invention can be stably produced in a strand form, and even when a drug is contained, the manufacturing property is good.

In contrast, in Comparative Example 1 in which a PVA-based resin containing 1.2 mass % of sodium acetate in the resin is used, the PVA-based resin is thermally decomposed by heating during the melt molding and the melt molding cannot be performed, and in Comparative Example 2 in which polyethylene glycol having a weight average molecular weight of 10,000 is used, many filaments are broken after the melt molding and stable production cannot be performed. Further, in Comparative Example 3 using glycerin, the flexibility is so high that the resin cannot be sent out from the printer nozzle.

Although the present invention has been described in detail with reference to specific embodiments, it will be apparent to those skilled in the art that various changes and modifications can be made without departing from the spirit and scope of the present invention. This application is based on a Japanese Patent Application (Japanese Patent Application No. 2018-142344) filed on Jul. 30, 2018, the contents of which are incorporated herein by reference.

REFERENCE SIGNS LIST

1 Tablet
3 Platform

The invention claimed is:

1. A fused deposition modeling type additive manufacturing material comprising:
   a polyvinyl alcohol-based resin;
   a polyethylene glycol having a weight average molecular weight of 200 to 1,000; and
   a carboxylic acid metal salt in an amount of 0.8 mass % to 0.0001 mass % with respect to the polyvinyl alcohol-based resin; wherein
   a degree of saponification of the polyvinyl alcohol-based resin is 95 mol % or less.

2. The fused deposition modeling additive manufacturing material according to claim 1, wherein the degree of saponification of the polyvinyl alcohol-based resin is 70 mol % to 95 mol %.

3. The fused deposition modeling additive manufacturing material according to claim 1, wherein an average degree of polymerization of the polyvinyl alcohol-based resin is 200 to 1,500.

4. The fused deposition modeling additive manufacturing material according to claim 1, a content of the polyethylene glycol is 1 to 50 parts by mass with respect to 100 parts by mass of the polyvinyl alcohol-based resin.

5. The fused deposition modeling additive manufacturing material according to claim 1, further comprising: a drug.

6. A filament comprising the fused deposition modeling additive manufacturing material according to claim 1.

* * * * *

UNITED STATES PATENT AND TRADEMARK OFFICE
CERTIFICATE OF CORRECTION

| | | |
|---|---|---|
| PATENT NO. | : 12,043,730 B2 | Page 1 of 1 |
| APPLICATION NO. | : 17/154547 | |
| DATED | : July 23, 2024 | |
| INVENTOR(S) | : N. Sakai | |

It is certified that error appears in the above-identified patent and that said Letters Patent is hereby corrected as shown below:

In the Claims

Column 16, Line 10 (Claim 1, Line 1), please change "modeling type additive" to --modeling additive--

Signed and Sealed this
Thirty-first Day of December, 2024

Derrick Brent
*Acting Director of the United States Patent and Trademark Office*